(12) United States Patent
Polonio et al.

(10) Patent No.: US 7,486,657 B2
(45) Date of Patent: Feb. 3, 2009

(54) RADIO CONTROLLED CLOCK AND METHOD FOR RETRIEVING TIME INFORMATION FROM TIME SIGNALS

(75) Inventors: Roland Polonio, Neckarsulm (DE); Hans-Joachim Sailer, Heilbronn (DE)

(73) Assignees: ATMEL Germany GmbH, Heilbronn (DE); C-MAX Europe GmbH, Heilbronn (DE)

( * ) Notice: Subject to any disclaimer, the term of this patent is extended or adjusted under 35 U.S.C. 154(b) by 811 days.

(21) Appl. No.: 10/910,261

(22) Filed: Aug. 2, 2004

(65) Prior Publication Data
US 2005/0036514 A1 Feb. 17, 2005

(30) Foreign Application Priority Data
Jul. 31, 2003 (DE) ................. 103 34 990

(51) Int. Cl.
*H04J 3/06* (2006.01)
(52) U.S. Cl. ........................... 370/350; 370/509
(58) Field of Classification Search ................. None
See application file for complete search history.

(56) References Cited

U.S. PATENT DOCUMENTS

| 4,287,597 | A | * | 9/1981 | Paynter et al. ............. 455/12.1 |
| 4,440,501 | A |   | 4/1984 | Schulz |
| 4,768,178 | A |   | 8/1988 | Conklin et al. |
| 4,823,328 | A |   | 4/1989 | Conklin et al. |
| 5,105,396 | A |   | 4/1992 | Ganter et al. |
| 5,349,570 | A |   | 9/1994 | Kaiser |
| 5,528,560 | A |   | 6/1996 | Ogiyama |
| 5,727,022 | A |   | 3/1998 | Schaefer et al. |
| 5,745,656 | A | * | 4/1998 | Memmler et al. ............. 706/45 |

(Continued)

FOREIGN PATENT DOCUMENTS

DE 1 803 093 8/1969

(Continued)

OTHER PUBLICATIONS

Reinhard Kalhoefer, "Die Realisierung kompakter stoersicherer Funkuhren mit den Mitteln der Mikroelktronik" (The Realization of Compact Interference-Resistant Radio-Controlled Clocks with the Means of Microelectronics), Darmstaedter Dissertation D 17; 1980; pp. 6-19, 50-59, 100-103, 124-129; p. 17 second paragraph, p. 58 last paragraph.

(Continued)

*Primary Examiner*—Wing F Chan
*Assistant Examiner*—Eunsook Choi
(74) *Attorney, Agent, or Firm*—W. F. Fasse; W. G. Fasse

(57) ABSTRACT

Time information is retrieved from time signals transmitted by a transmitter and received by a receiver. The retrieval relies on the examination of at least one time portion (86, 87, 88) within a time frame. The time portion has a duration shorter than the duration of the time frame (80-82), to reduce processing operations. The examination checks whether an amplitude of the time signal changed within a time portion. The amplitude change either up or down is then evaluated for the retrieval of the time information. A receiver for receiving the time signals includes components for preprocessing the received time signals thereby reducing the processing steps of a microprocessor connected to the output of the receiver.

24 Claims, 6 Drawing Sheets

U.S. PATENT DOCUMENTS

| | | | |
|---|---|---|---|
| 5,805,647 A * | 9/1998 | Schafer et al. | 375/366 |
| 5,818,851 A | 10/1998 | Memmler | |
| 6,359,525 B1 | 3/2002 | Mohan et al. | |
| 6,643,223 B2 * | 11/2003 | Fujisawa | 368/204 |
| 2003/0117901 A1 | 6/2003 | Takada et al. | |
| 2003/0117902 A1 * | 6/2003 | Suzuki et al. | 368/47 |
| 2003/0189876 A1 | 10/2003 | Chan | |
| 2004/0246821 A1 * | 12/2004 | Fujisawa | 368/204 |
| 2005/0116856 A1 | 6/2005 | Haefner et al. | |
| 2005/0122951 A1 | 6/2005 | Kuehnle et al. | |
| 2005/0122952 A1 | 6/2005 | Haefner et al. | |
| 2005/0147080 A1 | 7/2005 | Haefner et al. | |
| 2005/0169230 A1 | 8/2005 | Haefner | |
| 2005/0175039 A1 | 8/2005 | Haefner et al. | |
| 2005/0202796 A1 | 9/2005 | Haefner et al. | |
| 2005/0260958 A1 | 11/2005 | Haefner et al. | |
| 2006/0286950 A1 * | 12/2006 | Becker | 455/171.1 |

FOREIGN PATENT DOCUMENTS

| | | |
|---|---|---|
| DE | 27 01 609 | 2/1978 |
| DE | 26 43 250 | 3/1978 |
| DE | 28 02 040 | 7/1979 |
| DE | 30 15 312 | 10/1981 |
| DE | 31 01 406 | 1/1983 |
| DE | 32 36 162 | 4/1984 |
| DE | 33 46 091 | 7/1985 |
| DE | 35 04 338 | 8/1986 |
| DE | 35 16 810 | 11/1986 |
| DE | 37 19 650 | 12/1988 |
| DE | 37 33 965 | 4/1989 |
| DE | 37 33 966 | 4/1989 |
| DE | 42 37 112 | 5/1993 |
| DE | 43 04 321 | 8/1993 |
| DE | 43 19 946 | 12/1993 |
| DE | 42 27 502 | 3/1994 |
| DE | 42 33 126 | 4/1994 |
| DE | 93 00 945 | 5/1994 |
| DE | 42 42 384 | 6/1994 |
| DE | 43 32 798 | 3/1995 |
| DE | 44 03 124 | 8/1995 |
| DE | 44 12 892 | 10/1995 |
| DE | 44 27 885 | 2/1996 |
| DE | 44 42 818 | 6/1996 |
| DE | 195 14 030 | 10/1996 |
| DE | 195 14 031 | 10/1996 |
| DE | 195 14 036 | 10/1996 |
| DE | 195 40 592 | 5/1997 |
| DE | 198 08 431 | 9/1999 |
| DE | 298 13 498 | 12/1999 |
| DE | 103 15 429 | 10/2003 |
| EP | 0 042 913 | 1/1982 |
| EP | 0 201 061 | 11/1986 |
| EP | 0 305 200 | 3/1989 |
| EP | 0 455 183 | 11/1991 |
| EP | 1 079 554 | 2/2001 |
| EP | 1 316 861 | 6/2003 |
| JP | 11-030677 | 2/1999 |
| JP | 2002-286877 | 10/2002 |
| JP | 2003-125012 | 4/2003 |
| WO | WO2004/036742 | 4/2004 |

OTHER PUBLICATIONS

Wolfgang Hilberg, "Funkuhren (Radio-Controlled Clocks)"; R. Oldenbourg Publishers, Munich, Federal Republic of Germany; Jan. 1983; ISBN 3-486-27341-8; pp. 219-234; p. 230 last paragraph.

Michael Arnoldt, "Zeitzeichen- und Normalfrequenzempfang (Time Signal and Normal Frequency Reception)"; Franzis', Munich, Federal Republic of Germany; Jun. 1987; ISBN 3-7723-8171-5; pp. 29-41, 97, 124-161; p. 39 last paragraph Section 1.4.5; p. 40 section 1.4.6.

"Die erste Funkuhr am Handgelenk (The First Radio-Controlled Watch on the Wrist)"; article in magazine Funkschau 15/1990, pp. 52, 53.

Peter Hetzel "Time Information and Normal Frequency" (Zeitinformation und Normalfrequenz) Telecom Praxis, vol. 1, Jan. 1993, pp. 25-36.

\* cited by examiner

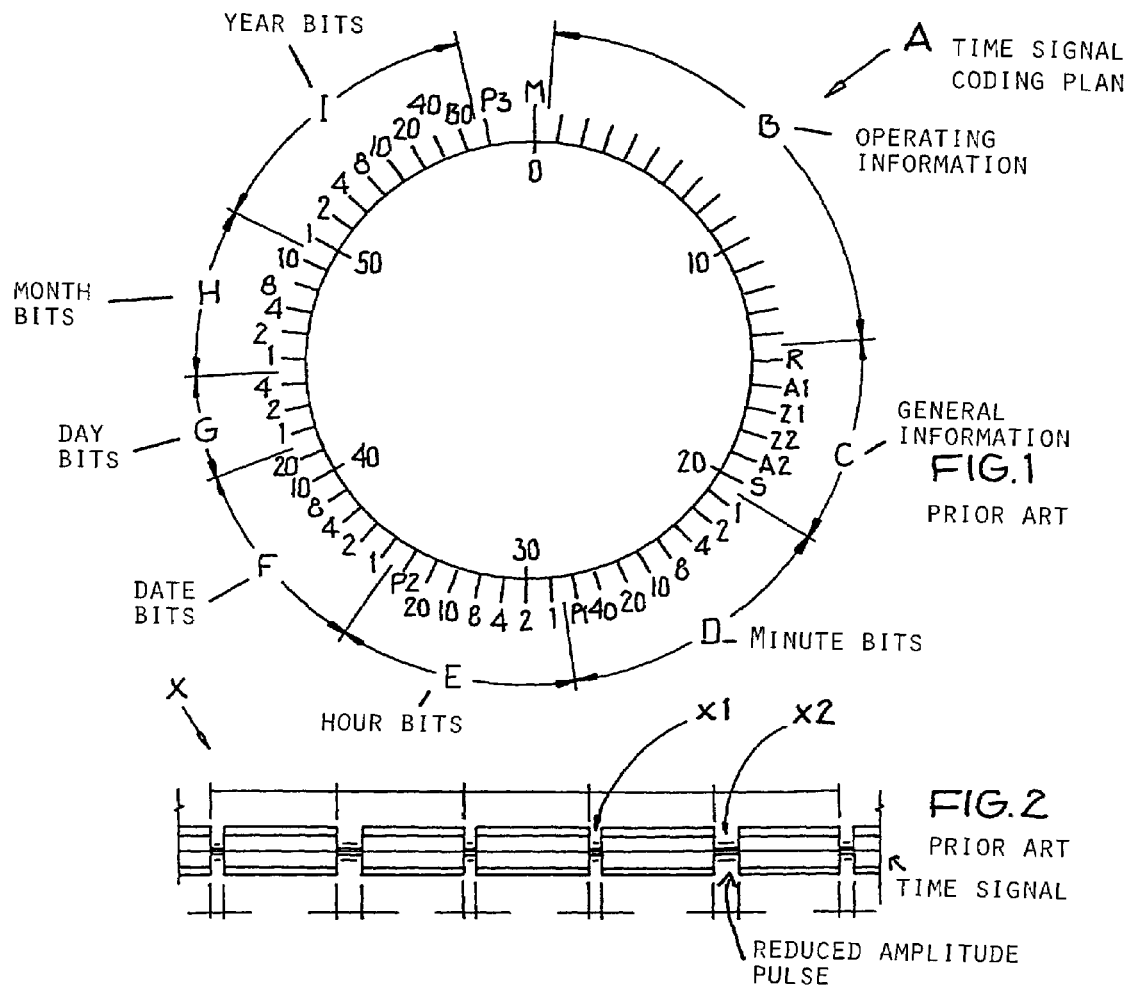
FIG. 1 PRIOR ART
FIG. 2 PRIOR ART
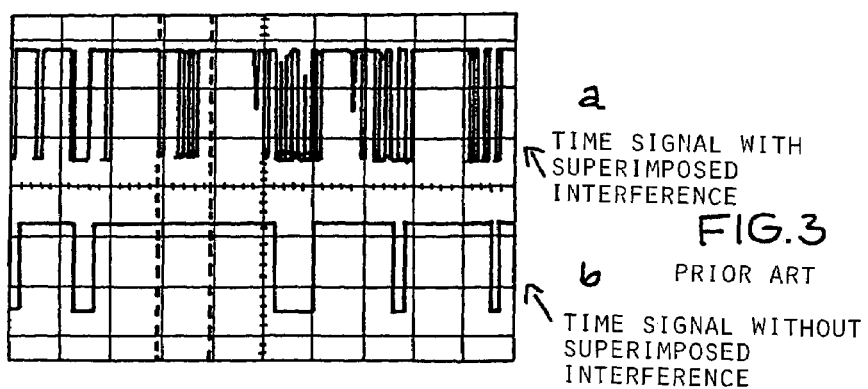
FIG. 3 PRIOR ART

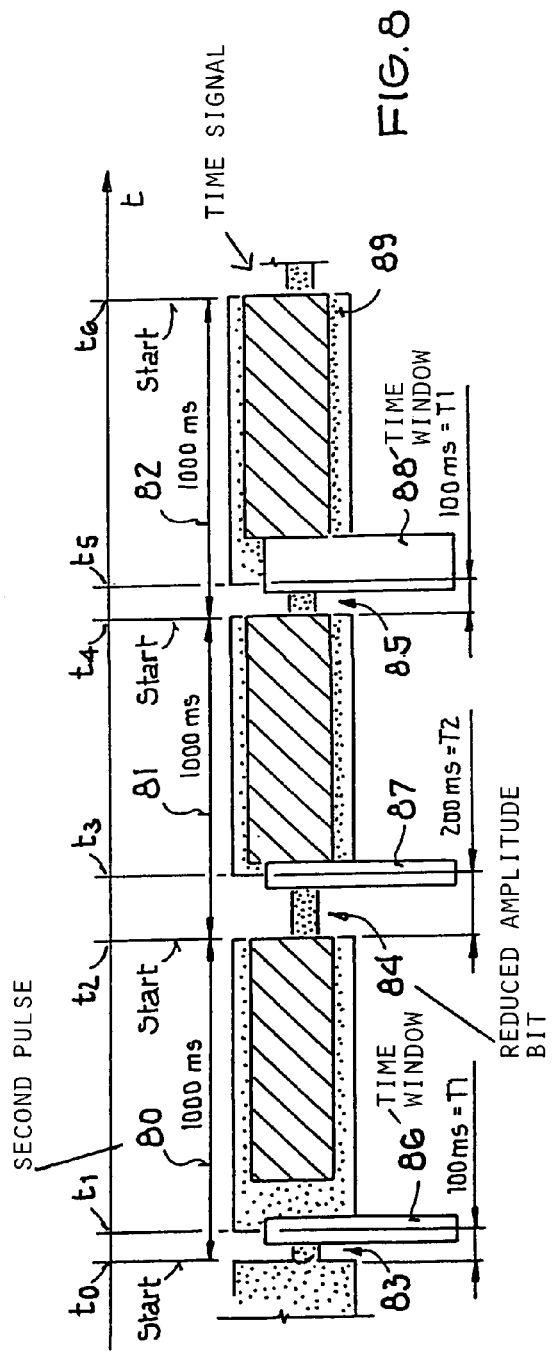
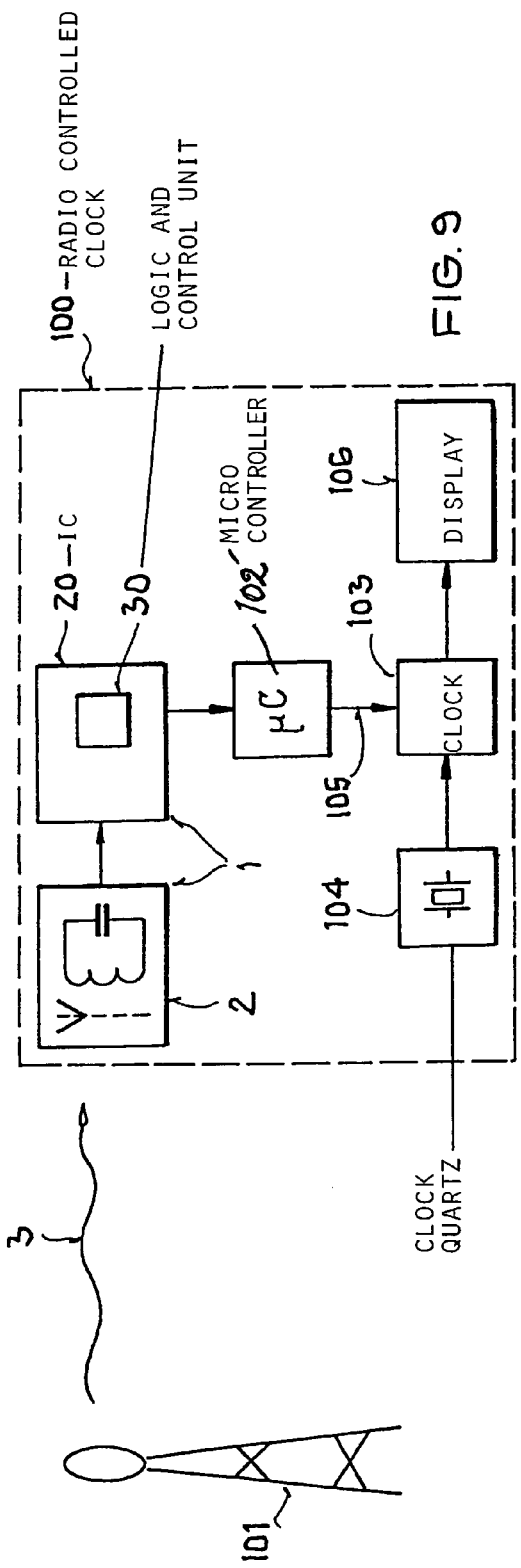

RADIO CONTROLLED CLOCK AND METHOD FOR RETRIEVING TIME INFORMATION FROM TIME SIGNALS

CROSS-REFERENCE TO RELATED APPLICATION

This application is related to U.S. application Ser. No.11/051,071filed on Feb. 4, 2005.

PRIORITY CLAIM

This application is based on and claims the priority under 35 U.S.C. §119 of German Patent Application DE 103 34 990.1, filed on Jul. 31, 2003, the entire disclosure of which is incorporated herein by reference.

FIELD OF THE INVENTION

The invention relates to a radio controlled clock and to a method for retrieving time information from time signals that are emitted by a time signal transmitter. A receiver for the time signals provides the radio controlled clock with the necessary time information by operating in accordance with the present method. The time signal transmission may be wireless or by wire.

BACKGROUND INFORMATION

Measuring and displaying the passage of time must be as precise as possible and has been a historical concern. That concern is even more important for modern society with its complex economic activities and with its different communication systems which require a uniform and additionally an especially exact time measuring. Precise time information has been made possible by modern cesium controlled atomic clocks which measure the time with a very high precision. However, there is a need to provide the precise time information also to people who do not have access to an atomic clock.

Following the discovery of radio waves it has been recognized early that such waves are a suitable medium for the transmission of time information. In spite of the importance that the transmission of time information through satellites has achieved, the distribution of time information by long wave radio transmission plays an important role today. Particularly the following characteristics of a long wave radio wave make these waves of interest for the transmission of time information today and in the future. Long wave time signals have a very large range. These waves penetrate into buildings and they can be received with very small ferrite antennas. Obstructions such as trees or buildings cause a substantial damping of received high frequency satellite signals. Contrary thereto the receipt of long wave signals is hardly impaired by such obstacles. The propagation characteristics of long waves modulated with time information combined with the availability of modern microelectronics make it possible to construct compact radio controlled clocks which can, for example, be operated with a battery or by solar energy collected by solar cells.

A transmitter is required for transmitting long waves modulated with the time information. Such a transmitter must supply the respective time information to all radio controlled clocks present within the transmitting range of the transmitter. In Germany the "Physikalisch Technische Bundesanstalt (PTB)" maintains a long wave transmitter DCF-77 which transmits a reliable time signal and a normal frequency. This DCF-77 transmitter in Germany is controlled by atomic clocks and emits at the frequency of 77.5 KHz with a transmission power of 50 KW. This frequency is outside the receiver frequency range of normal radio receivers. Further, the transmitter DCF-77 transmits, on a continuous basis, long wave time signals in accordance with the official atomic time scale CET (Central European Time). Similar transmitters are used in other countries, for example in Japan and the USA. These transmitters transmit time information on long wave carrier frequencies in the range between 40 and 120 KHz by means of amplitude modulated signals.

The above mentioned countries use the same format for the transmission of time information. The so-called format is a time frame which has a duration of precisely one minute. This time frame comprises values or information for the minute, the hour, the day, the weekday, the month, the year, and so forth. This information within the time frame is present in the form of a BCD (binary coded decimal) code. These binary coded decimal codes are transmitted with a pulse duration modulation at the rate of 1 Hz per bit. In such a pulse duration modulation either the leading edge or flank or the trailing edge or flank of the first pulse of a time frame is synchronized with exactly zero or null seconds. A typical radio controlled clock is so constructed that the time adjustment begins with the point of time or instant at which the null second signal was received for the first time and then receiving the time information of a time frame or of several time frames.

The transmission of time information is accomplished by these transmitters with the aid of so-called time signals. Therefore, these transmitters or receivers of time signals are referred to herein as time signal transmitters or time signal receivers. A time signal is defined as a transmitter time signal of short duration which has the purpose or object to transmit the time reference information provided by the time signal transmitter. More specifically, the time signal is a modulation oscillation with generally several time markers which, after demodulation, merely represent one impulse or pulse which reproduces the transmitted time reference with a defined uncertainty. This demodulation result in the form of a single impulse or pulse must not be confused with an encoded time information which transmits the text of a clock time value in the form of an impulse code.

FIG. 1 shows a coding scheme or plan A of the encoded time information for the time signal transmitter DCF-77 in Germany. The coding plan or scheme comprises 59 bits whereby each bit corresponds to or represents one second of the time frame. Thus, within a minute it is possible to transmit a so-called time signal telegram which contains binary encoded information particularly with regard to time and date. The first fifteen bits B comprise a general or common encoding which for example contains operating information. The next five bits C contain a general information. The reference character R designates an antenna bit. A1 designates an announcement bit for the transition from Central European Time (CET) to Central European Summer Time (CEST) and back again. Reference characters Z1 and Z2 designate time zone bits, A2 designates an announcement bit for a leap second while S designates a starting bit of the encoded time information. Beginning with bit 21 and ending with bit 59 the time and date informations are transmitted in a BCD-code whereby the data are respectively valid for the next following minute. Further, the bits in the zone D comprise information regarding the minute, the bits in the zone E contain information regarding the hour, the bits in zone F contain information regarding the calendar day, the bits in the zone G contain information regarding the day of the week while the bits in the zone H contain information regarding the month and the bits in the zone I contain information regarding the calendar year.

These informations are available in a bit-by-bit fashion and in encoded form. At the end of each zone D, E and I so-called testing bits P1, P2, P3 are inserted. The 60th bit is not occupied and serves for the purpose of indicating the beginning of the next time frame. Reference character M designates a minute marker and thus the beginning of the time information telegram.

The structure and the bit occupancy of the encoded plan or scheme A shown in FIG. 1 for the transmission of time signals is generally known and described for example in an article by Peter Hetzel entitled "Time Information and Normal Frequency" published in Telecom Praxis, Volume 1, 1993.

The transmission of the time signal information is performed by amplitude modulating a carrier frequency with the individual second markers. The modulation comprises a lowering X1, X2 or a raising of the carrier signal X at the beginning of each second with the exception of the $59^{th}$ second of each minute. The carrier amplitude is reduced for the duration of 0.1 seconds at X1 or for the duration of 0.2 seconds at X2, to about 25% of the normal amplitude. These amplitude reductions and increases are used in the above mentioned transmitter DCF-77. These amplitude reductions having differing time durations respectively define second markers or data bits. These differing time durations of the second markers serve for the binary encoding of the time of day and the date, whereby the second markers having a duration of 0.1 seconds (X1) correspond to the binary "0" while those second markers with a duration of 0.2 seconds (X2) correspond to the binary "1". The absence of the 60th second marker announces the next following minute marker. This announcement in combination with the respective second makes possible an evaluation of the time information transmitted by the time signal transmitter. FIG. 2 shows by way of an example a section or portion of such an amplitude modulated time signal which is encoded by the lowering of the carrier frequency signal whereby the lowering has different impulse durations.

Conventional time signal receivers as for example described in the German Patent Publication DE 35 16 810 C2, receive the time signal as transmitted by the time signal transmitter in amplitude modulated form. These conventional receivers provide at their output a demodulated signal in the form of impulses having different durations. This demodulation takes place in real time, more specifically an impulse of a different duration appears per second at the output of the receiver corresponding to an idealized time signal as shown in FIG. 2. The time information is thus available in coded form based on the impulses of different time durations. The time signal receiver supplies these impulses of different time durations to a microcontroller connected to the output of the time signal receiver. The microcontroller evaluates the impulses and decides, based on the pulse duration, whether a logic bit value of "1" or "0" is to be allocated to the respective pulse or impulse. To perform this bit value allocation, first the beginning of a second of a respective time frame of the time signal is determined. Once the beginning of a second is known, it is possible to determine based on the pulse duration whether the bit value "1" or "0" applies. The microcontroller accepts in the following all 59 bits of a minute and determines on the basis of the bit encodings of a respective second impulse which precise time and date are present. This evaluation of the precise time and date is however only possible if the 59 second bits of a minute have been recognized without any ambiguity so that a "0" or a "1" can be allocated unambiguously to each of these second bits. Such a method for ascertaining the beginning of a second in the signal of a time signal transmitter is for example described in the German Patent Publication DE 195 14 036 C2.

In connection with the above mentioned German Patent Publication DE 195 14 036 C2 there exists a problem in that interfering signals may be superimposed on the time signals. Such interfering signals occur due to interfering fields generated by electrical or electronic equipment. FIG. 3(a) of said German Patent Publication shows a measurement of a time signal on which an interference signal is superimposed. Such a signal becomes available at the output of the receiver. FIG. 3b shows, compared to FIG. 3a, the respective time signal as it is transmitted by the time signal transmitter without any superimposed interfering signals. Depending on the type and size or volume of the interfering signals it may happen that the reception of the time signals is impaired. In such a case it is, however, necessary that the time signal is transmitted and received for a full minute until a correct reception of the time signal is possible so that the 59 second bits for determining the correct time and the correct date are available. Following such a situation, the previous result is compared with a second reception free of disturbances for one minute based on a complete time signal telegram to perform a plausibility test. When it is ascertained that coincidence or rather conformity exists between the two received time signal telegrams the information can be decoded and transformed into the time information.

Disturbances are particularly substantial in environments which are disturbance prone, for example in large cities, in and around large industrial plants, and in offices where there is a large number of data monitors and computer devices. In these facilities the disturbances are especially large and are called "disturbance fog". Due to this disturbance fog it is frequently possible only after a very long time to have a correct reception of the time signal telegram. As a result, the time signal receivers must remain activated for a respectively long time. In connection with time signal receivers that are operated for example by a battery or an accumulator, this situation leads to a rapid consumption of the available energy supply.

Frequently a reception free of disturbance is available only during night hours. This means that a new start of the time signal receiver is possible only during that night time or only the following day when an exact time signal is available. This may happen for example when batteries need to be exchanged.

Further problems have been found to exist as follows. A microcontroller or processor is used in the radio controlled clock for decoding the time signal. The microcontroller which receives the output signal from the time signal receiver is typically constructed as a four-bit microcontroller to keep costs down. Such a microprocessor comprises a rather small memory of about two kBytes. This memory is used primarily for the program of the microcontroller. The program in turn serves primarily for the treatment of the disturbances and of different second impulses. The microcontroller in conventional clocks is substantially completely occupied with evaluating the received, disturbed second impulses. During this time the microcontroller is not available for solving other problems.

A very substantial knowledge regarding the occurrence of these disturbances during the reception of the time signal is necessary especially for a time signal on which disturbances are superimposed, as shown particularly in FIG. 3a of German Patent Publication DE 195 14 036 C2. Based on the special knowledge, the respective programs of the microcontrollers are so developed that a sufficiently certain evaluation of the time signal is possible even in an environment where relatively large disturbances exist. These programs are currently optimized with regard to the treatment of disturbances and thus determine substantially the quality of conventional radio controlled clocks.

Moreover, due to limited memory space it is possible to use only very compact programs. These programs are typically developed in an assembler programming language in order to achieve a high quality and certainty in the evaluation of the second impulses and in order to realize a very intelligent recognition of the disturbing signals. For these reasons, an exceptionally high or large know-how is necessary for the programming in order to solve the problems that must be met by the receiver technology and the limiting conditions outlined above. These problems particularly involve the influence of disturbances on the precision of the time signals and further problems mainly derived from the long wave technology and analog technology. Additionally, these programs are supposed to be programmed to be very compact so that the memory space requirement becomes as small as possible. However, at this time there are hardly any programmers capable of developing such respective programs while maintaining or satisfying the above mentioned limiting conditions. The quality of such programs, however, determines substantially the quality of a radio controlled clock.

The following publications provide further background information regarding radio controlled clocks and receiver circuits for receiving time signals. Reference is made in this context to German Patent Publications: DE 198 08 431 A1; DE 43 19 946 A1; DE 43 04 321 C2; DE 42 37 112 A1 and DE 42 33 126 A1. With regard to the synchronization of a time signal, reference is made to DE 298 13 498 U1 and DE 44 03 124 C2. Regarding the information retrieval and processing of time information from time signals, reference is made to DE 195 14 031 C2; DE 37 33 965 C2 and EP 042 913 B1.

OBJECTS OF THE INVENTION

In view of the foregoing it is the aim of the invention to achieve the following objects singly or in combination:

- to reduce the computing effort and expense in the evaluation of time signals received in a radio controlled clock, whereby the time signals may be transmitted wirelessly or by wire;
- to achieve a more rapid and a qualitatively improved evaluation of the received time signals, which evaluation is also less sensitive to disturbances;
- to reduce particularly the memory space requirements in connection with the programs needed for the evaluation of the time signals; and
- to retrieve the time information in circuitry forming part of a time signal receiver rather than in a separate microprocessor or microcontroller.

SUMMARY OF THE INVENTION

The invention further aims to avoid or overcome the disadvantages of the prior art, and to achieve additional advantages, as apparent from the present specification. The attainment of these objects is, however, not a required limitation of the claimed invention.

The method for retrieving time information from a time signal according to the invention is characterized by the following steps:

a) defining a time signal as comprising a plurality of time frames, each time frame having a constant time frame duration;

b) selecting from each of said time frames at least one time duration that is shorter than said constant time frame duration, and c) examining said at least one time duration regarding any change in an amplitude of said time signal for retrieving said time information.

A modified method relying on the presentation of the time information in the form of data bits retrieves that information according to the invention by the following steps:

a) forming said time signal of a multitude of time frames, each time frame having a constant time frame duration, b) allocating to each said time frame at least one data bit representing said time information in said time signal, c) determining a value of said at least one data bit on the basis of a duration of an amplitude change of said time signal, d) allocating a first logic value to a first data bit, said first logic value representing a first time duration of a first amplitude change of said time signal, e) allocating a second logic value to a second data bit, said second logic value representing a second time duration of a second amplitude change, said first and second amplitude changes providing at least two amplitude changes, f) determining a time interval from said at least two amplitude changes that follow each other; and g) deriving a value of a data bit from the duration of said time interval.

The method for the retrieval of time information relying on data bits containing the time information is further modified according to the invention by the combination of the following steps:

a) forming said time signal of a multitude of time frames, each time frame having a constant time frame duration, b) allocating to each said time frame at least one data bit representing said time information in said time signal, c) determining a value of said at least one data bit on the basis of a time duration of an amplitude change of said time signal, d) allocating a first logic value to a first data bit, said first logic value representing a first time duration of a first amplitude change of said time signal, e) allocating a second logic value to a second data bit, said second logic value representing a second time duration of a second amplitude change, said first and second amplitude changes providing at least two amplitude changes, f) determining a first instant of said first and second amplitude change, g) determining a second instant with reference to the first instant and relative to said first and second time durations, h) determining a third instant relative to the second time duration, i) examining a first time portion next to said first instant whether the amplitude of the time signal returns to the original amplitude value, and j) allocating a first logic value to said at least one data bit if said amplitude returns within said first time portion to the original amplitude value.

According to the invention there is further provided a receiver for receiving time signals including time information, said receiver comprising at least one antenna for picking-up said time signals, a logic and control unit for retrieving said time information from said time signals, and an input/output interface connected to an output of said logic and control unit for providing output signals that have been derived from said time information of said time signals.

According to the invention there is further provided a radio controlled clock, comprising at least one antenna for receiving time signals, an integrated circuit having an input connected to said antenna and including an input amplifier, a filter and a rectifier, a logic and control unit connected to said rectifier for retrieving time information from said time signals, and an input/output unit having an input connected to said logic and control unit and outputs for providing output signals derived from said time signals, a program controlled device connected to said outputs for calculating time-of-day and date signals, and an independent clock including a display connected to receive said time-of-day and date signals for displaying a time and date said independent clock correcting said time and date on the basis of said time-of-day and-date signals.

In order to reduce the work load of a microprocessor or microcontroller, the invention also teaches providing a receiver with circuitry for retrieving the time information directly in the receiver. Such receiver is then used in a radio controlled clock, particularly using a receiver for retrieving and evaluating time information from a transmitted time signal in a radio controlled clock.

The basic concept of the present invention resides in the discovery that it is not necessary to analyze the entire duration of a respective time frame in order to obtain decoded time information. Thus, the present invention starts with the recognition that the coded time information is present in a smaller time duration within a respective time frame. In the remaining time span of a time frame no time information is present. These smaller time durations are predetermined by the protocol of the time signal telegram and are thus known. Accordingly, it is completely sufficient to detect only those areas or time durations or time portions of the time signal in which an expected change of the time signal takes place. A change may involve an increase as well as a decrease of the amplitude of the time signal. Thus, generally only a determined or limited time duration within each time frame needs to be analyzed in order to obtain the time information whereby only changes of the amplitude are to be analyzed. The duration of these changes is smaller than the duration of a complete time frame. Ideally, only those time areas or durations in which a change is expected need to be analyzed regarding a change. The remaining time durations or areas of the respective time frame do not need to be considered.

Depending on the required precision of the method and the respective precision of the receiver components, the areas around an expected change may be randomly small. As a result, the system resources can be reduced by reducing the computing effort and expense, particularly for the calculation of information outside the encoded area or zone. Conventionally these information calculations must be done by using costly programs which are not "free of charge", so to speak. Such effort and expense can now be saved according to the invention.

In case of a synchronized time frame, more specifically in case of a known beginning of an encoded time portion of a time frame, the end of that encoded time portion can be detected by analyzing only a single time portion around an expected amplitude change to see whether a change has taken place. If a change is detected in such a time portion or area, then a first logic value can be allocated to this coded area directly without analyzing a further time portion regarding an expected change whereby this expected change corresponds to a second logic value. On the other hand if no change is detected in the only time portion, then the second logic value can be allocated directly to this coded time area. This method functions only if there is a sufficient certainty that a change is detectable under disturbing conditions. This certainty must indicate a data bit and not a disturbance in the amplitude of the time signal itself.

In order to increase the certainty of the decoding of the time information and for verifying the decoded data it is suitable and advantageous if a further time area or portion is analyzed regarding an expected change or rather a change in the amplitude which would correspond to a second logic value. This additional analyzation of a second time duration or area is particularly recommended when the receiver according to the invention is operated in an environment that is subject to substantial disturbances.

According to the invention a time interval is determined on the basis of at least two amplitude changes that follow each other. The logic value of a data bit is then deduced from the duration of this time interval. More specifically, in this context two amplitude changes following each other within the respective time frame are analyzed.

According to the invention only the beginning of an amplitude reduction or lowering within the time frame of a time signal and the potential end of an amplitude reduction is analyzed on the basis of known time markers. In this manner a time duration is obtained from which it is rather simple to determine the data bit of the corresponding time or second marker whereby the remaining areas or portions of the second marker and thus also any disturbances that may be present need not be taken into account. The obtaining of this time information takes place already in the receiver according to the invention whereby a microprocessor is relieved from obtaining the time information.

It is important in the method according to the invention that the time frame or rather the second impulse is synchronized with a fixed known time base. Based on this known time base, which is derived from a reference frequency, the receiver circuit according to the invention synchronizes itself automatically onto the respective beginning of this second impulse or of the respective time frame following a certain number of received second impulses.

This synchronization is achieved according to the invention by a synchronizing circuit which comprises a counter. The counter is charged by the exact clock signal of the fixed time base and the counter is set back by the respective received second impulse. Upon receipt of the second impulse a comparator compares the count in the counter with a fixed valued and deduces from this comparing any correction that is necessary for the synchronization. A synchronization is then achieved following a certain number of received impulses. This synchronization is advantageously achieved automatically without any input from a program whereby the synchronization can be implemented quite simply. Another advantage is seen in that the synchronization is achieved independently of the impulse length of the respective received impulses.

When the synchronization of the received impulses has been achieved, the precise beginning of a respective second and thus the information of the data bit are available. Subsequently it is merely necessary according to the invention to detect the respective end of the data impulses. Detecting the end of a data impulse is very simple because these data impulses can typically contain only few possible impulse durations. However these impulse durations may differ in the time signal transmitters of different countries. The determination of the end of a data impulse takes place in such a way that it is detected from a known time base whether the data impulse is still present or not in a specific time window that is characteristic for the respective data bit. The known time base is for example derived from a known clock signal. As a result it is possible to make a conclusion regarding the length or duration of the data impulse and thus the data bit itself.

Disturbing impulses which are superimposed on the impulse containing actual time information or disturbances which could be evaluated as pulses containing data are substantially avoided by the synchronization with the beginning of a second impulse and by the limitation of the scanning to transmitter specific impulse durations. As a result, the invention achieves a substantial immunity against disturbances as compared to conventional signal evaluations based on software which does not use any synchronization onto the beginning of a second because only a fraction, typically 10 to 30%, of the impulse of a time frame or rather of a second impulse is of significance for its evaluation. The remainder portion of the second impulse is typically not taken into account at all according to the invention.

These features of the invention provide the advantage that it is no longer necessary that the program of the microprocessor performs an involved procedure for treating disturbances within the time signal. Thus, it is no longer necessary or hardly necessary to have special knowledge regarding error treatment and impulse duration tolerances for evaluating or analyzing the received impulses. The programs needed according to the invention, thus, are substantially simpler than conventional programs so that the development of the software for practicing the invention is simpler and hence less expensive.

Moreover the data retrieval according to the invention is performed substantially completely in the present clock receiver. Therefore, the microprocessor is relieved of these functions and thus available for other control and computer functions. As a result, the program of the microprocessor can be simpler which directly results in the saving of memory space. Still another advantage is seen in that the microprocessor and thus the entire construction of the present radio controlled clock can be manufactured at substantially reduced costs.

Yet another advantage of the invention is seen in that the microprocessor or controller requires a smaller power input so that the useful life of an internal power supply such as a battery is enlarged. Another advantage is seen in that the determination of the beginning of a second can be accomplished by a method as is disclosed in the above mentioned German Patent Publication DE 195 14 036 C2. Therefore, the content of the German Patent Publication DE 195 14 036 C2 is completely incorporated by reference into the present disclosure of the invention.

BRIEF DESCRIPTION OF THE DRAWINGS

In order that the invention may be clearly understood, it will now be described, by way of example, with reference to the accompanying drawings, wherein:

FIG. 1 shows an encoding scheme or time signal telegram of time information transmitted by the above mentioned time signal transmitter DCF-77;

FIG. 2 illustrates a window of an idealized time signal including five second impulses;

FIG. 3 is a window of a real time signal (a) mentioned above at the output of a time signal receiver and the associated time signal (b) as transmitted by a time signal transmitter without any disturbances;

FIG. 8 shows a portion of a transmitted time signal for explaining the present method for synchronizing the time signal to the signal start of a second impulse; and FIG. 9 shows a substantially simplified block circuit diagram of a radio controlled clock according to the invention.

Figure 4:
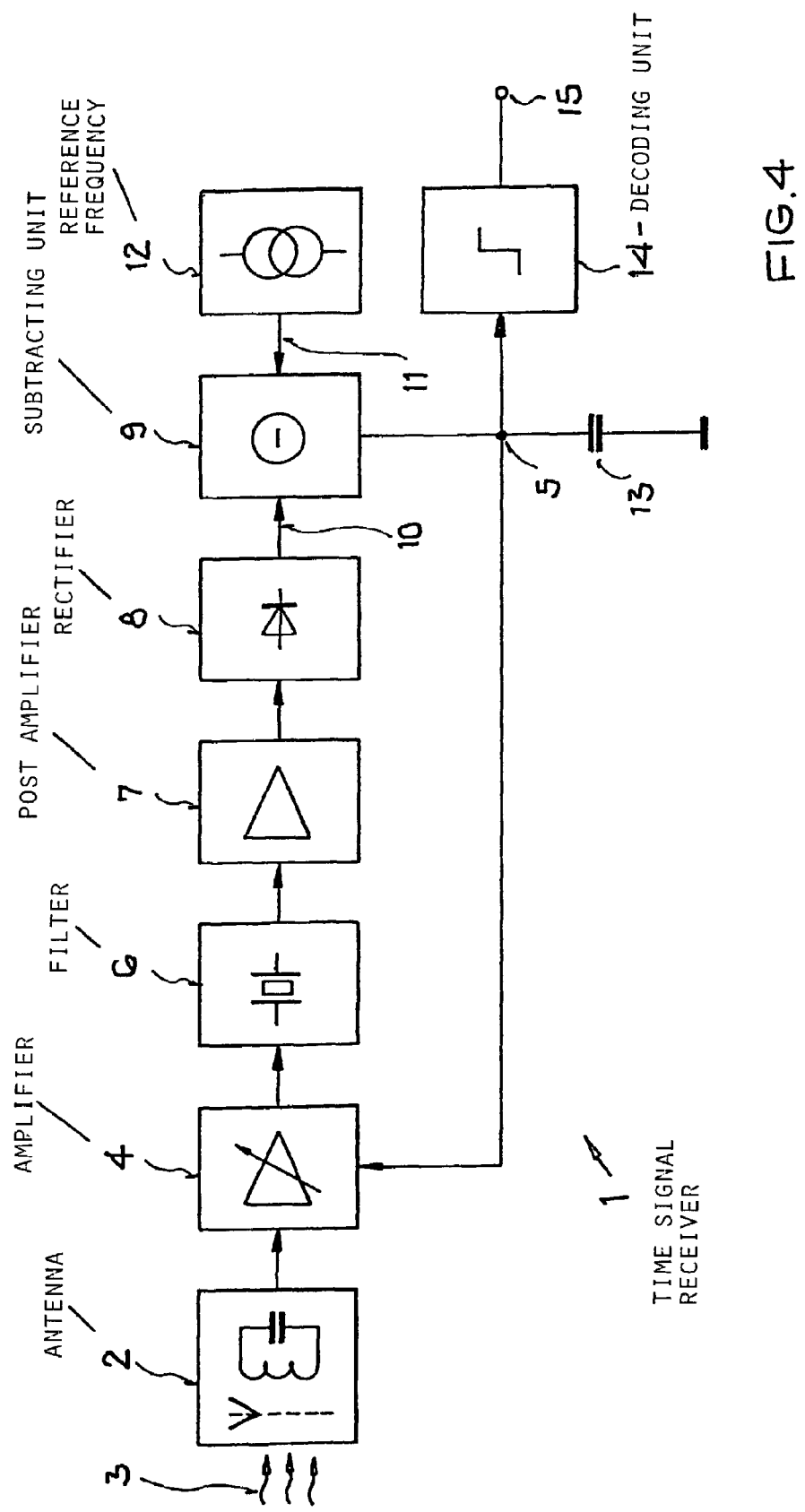
FIG. 4 is a block circuit diagram of a straight line receiver.

DETAILED DESCRIPTION OF PREFERRED EXAMPLE EMBODIMENTS AND OF THE BEST MODE OF THE INVENTION

In all figures of the drawings, the same elements or elements performing the same function, the same signals and the same functions are designated with the same reference characters unless otherwise indicated.

FIG. 4 shows a block circuit diagram of an analog receiver 1 constructed as a straight line receiver for receiving time signals. Such a straight line receiver 1 is particularly suitable and advantageous for use in a radio controlled clock.

The receiver 1 has an antenna 2 connected to the input of the receiver 1. The antenna 2 is constructed as a frame or ferrite antenna and is tuned to the frequency of the time signals 3 emitted by the antenna 101 of a time signal transmitter not shown. Please see FIG. 9. The antenna 2 is able to receive the time signal 3 emitted by the time signal transmitter. The output of the antenna 2 is connected to an input of a closed loop amplifier. A second input of the amplifier 4 receives a closed loop control signal 5 to be described in more detail below. The amplification by the amplifier 4 depends exponentially on the closed loop control signal 5 whereby certain deviations are permissible depending on the layout of the other functional components or elements.

A filter 6 is connected to the output of the closed loop amplifier 4. The filter 6 is preferably a piezoelectric filter tuned to the frequency of the time signal transmitter. The output of the filter 6 is connected to the input of a post amplifier 7. The output of the post amplifier 7 is connected to an input of a rectifier 8, for example a diode circuit. A subtracting unit 9 is connected to the output of the rectifier 8. The received, closed loop controlled, amplified and rectified time signal 10 is subtracted from a signal 11 which is generated by a reference frequency source 12. A difference signal appearing at the output of the subtracting unit 9 is supplied to a memory or storage capacitor 13 which is connected to a reference potential. The charge stored in the capacitor 13 or rather the voltage drop across the capacitor 13 forms a closed loop control signal or voltage 5 for controlling the amplifier 4 in closed loop fashion.

The memory or storage capacitor 13 and the subtracting component 9 together form a difference integrator which integrates the difference between the rectified signal 10 and the reference signal 11 over time. If the rectified time signal 10 and the reference signal 11 do not correspond to each other or do not coincide with each other, then the closed loop control signal 5 across the capacitor 13 changes. Thus, the amplification by the amplifier 4 also changes in the sense that the assumed difference becomes smaller. This procedure stops when the signals 10 and 11 are the same again.

The closed loop control signal or voltage 5 available at the junction between the subtracting component 9 and the storage capacitor 13 is also supplied to an input of a decoding unit 14. The decoding unit 14 ascertains from the closed loop control signal 5 an envelope curve for the amplitude scanning. A respective envelope curve signal 15 becomes available at the output of the transmitter 1 which is connected to a microprocessor or controller not shown in FIG. 4.

The construction and function of a straight line receiver 1 as described above is disclosed in more detail in the above mentioned German Patent Publication DE 35 16 810. Thus, this publication is incorporated by reference completely in the present disclosure with regard to the construction and function of the time signal receiver.

Figure 5:
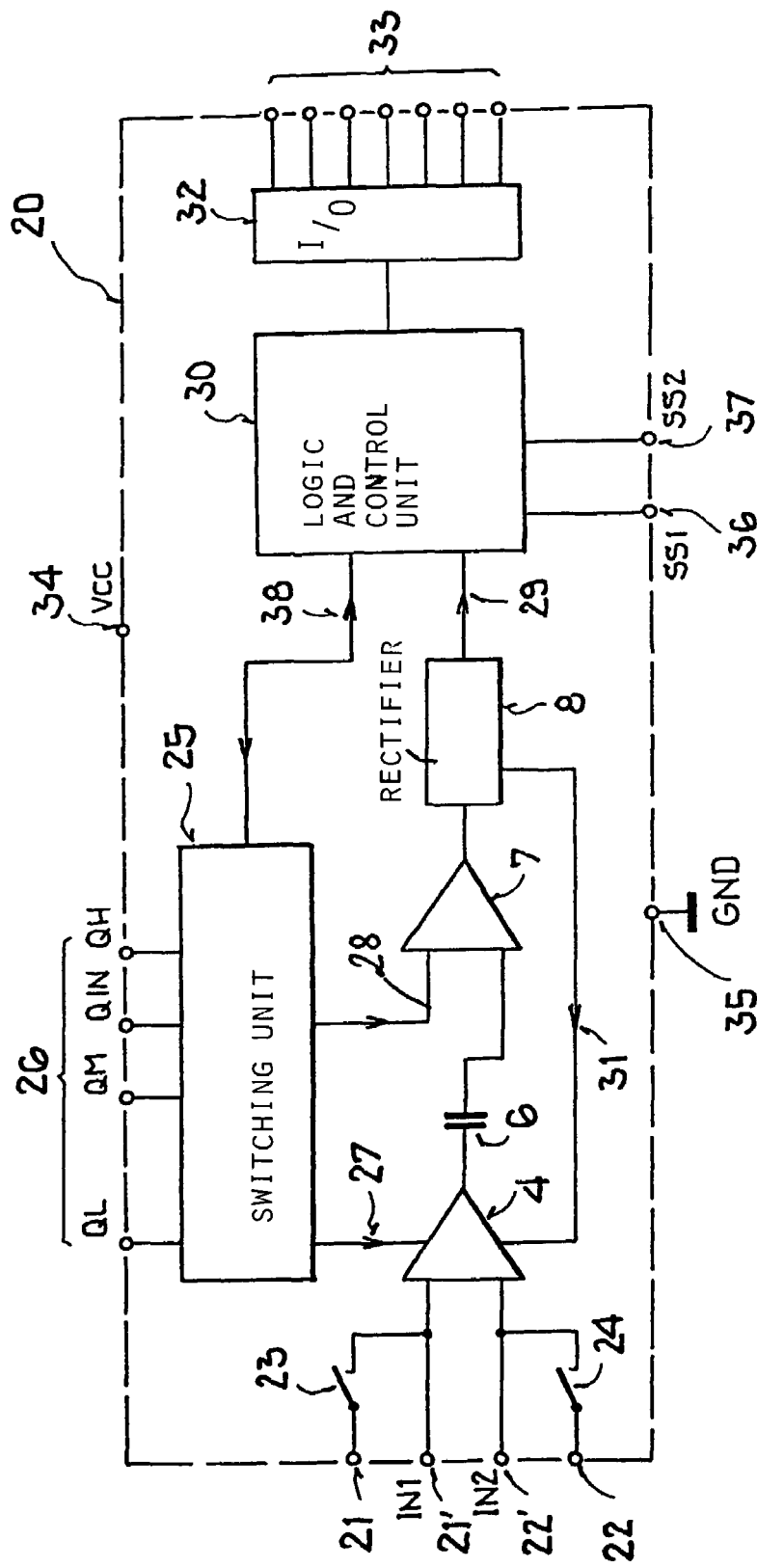
FIG. 5 illustrates an integrated circuit including a logic and control unit for use in a receiver according to the invention shown in FIG. 4.

With the aid of a detailed block circuit diagram, FIG. 5 shows a portion of a time signal receiver. An integrated circuit 20 is constructed for example for use in a time signal receiver as shown in FIG. 4. The integrated circuit 20 comprises two inputs 21 and 22 for connection to two antennas not shown. By using two and possibly more antennas it is possible that the receiver 1 can be tuned to the frequencies of several time signal transmitters. The closed loop controlled or regulated amplifier 4 may be connected respectively with one of these antenna inputs 21, 22 for example by a controllable switch 22, 23. The other input of the closed loop controlled amplifier 4 is connected with the inputs 21', 22', which are for example connectable to a respective reference signal IN1 and IN2. The closed loop controlled amplifier 4 is connected with its output through the filter 6 to an input of the post amplifier 7 whereby the filter 6 functions as a compensating element. The filter 6, such as a capacitor functioning as the filter, is looped into the circuit between the amplifier 4 and the input of the post amplifier 7. In this manner it becomes possible to compensate for parasitic capacities between the inputs QL to QH.

The integrated circuit 20 further comprises a switching unit 25 which includes for example a plurality of switchable filters connected to the inputs QL to QH. The switching unit 25 in combination with said plurality of switchable filters at the inputs QL to QH, is constructed to provide a plurality of frequencies at the output of the integrated circuit 20. These frequencies may be adjusted at the control inputs 26, 36 and 37 of the switching unit 25. The closed loop controlled amplifier 4 is controllable through a control signal 27 provided at an output of the switching unit 25. The switching unit 25 further produces an output signal 28 that is supplied to the second input of the post amplifier 7. The post amplifier 7 controls the rectifier 8. The rectifier 8 produces a closed loop control signal 31 also referred to as an AGC-signal (automatic gain control) for controlling the amplifier 4. The rectifier 8 further produces at its output a signal 29 having for example a rectangular waveform that is referred to as TCO-signal which is supplied to a logic and control unit 30.

An output of the logic and control unit 30 is connected with an input/output unit 32 which has input/output terminals 33 forming part of the integrated circuit 20 for example. The time signals that have been processed, decoded and stored in the logic and control unit 30 are available at these outputs 33. A microprocessor or controller not shown in FIG. 5, is connected with its input to a respective output 33 for reading out when needed the time signals that have been processed in the logic and control unit 30 as mentioned above. Furthermore a clock signal can be supplied to a respective terminal 33 of the integrated circuit 20 or rather of the logic and control unit 30.

For the further control of the switching unit 25, the latter is connected with the logic and control unit 30 through a conductor supplying a control signal 38, whereby the logic and control unit 30 triggers the switching unit 25 with the control signal 38. Further, the integrated circuit 20 comprises the above mentioned terminals 36 and 37 for suppling control signals SS1 and SS2 to the logic and control unit 30.

The construction and function of this logic and control unit 30 which includes the function of the subtracting unit 9, the storage capacitor 13 and the decoding unit 14 shown in FIG. 4, will be now described in more detail below.

The energy supply for the integrated circuit comprises a first power supply terminal 34 to which a first supply potential VCC is applied. The potential VCC may be a positive supply potential or a battery potential or voltage. A further supply terminal 35 is for example connected to ground GND which may be a negative supply potential or a reference potential. The details of the circuit connections of the elements to the power supply are not shown in the integrated circuit 20 illustrated in FIG. 5 so as to maintain an uncluttered overview.

Figure 6:
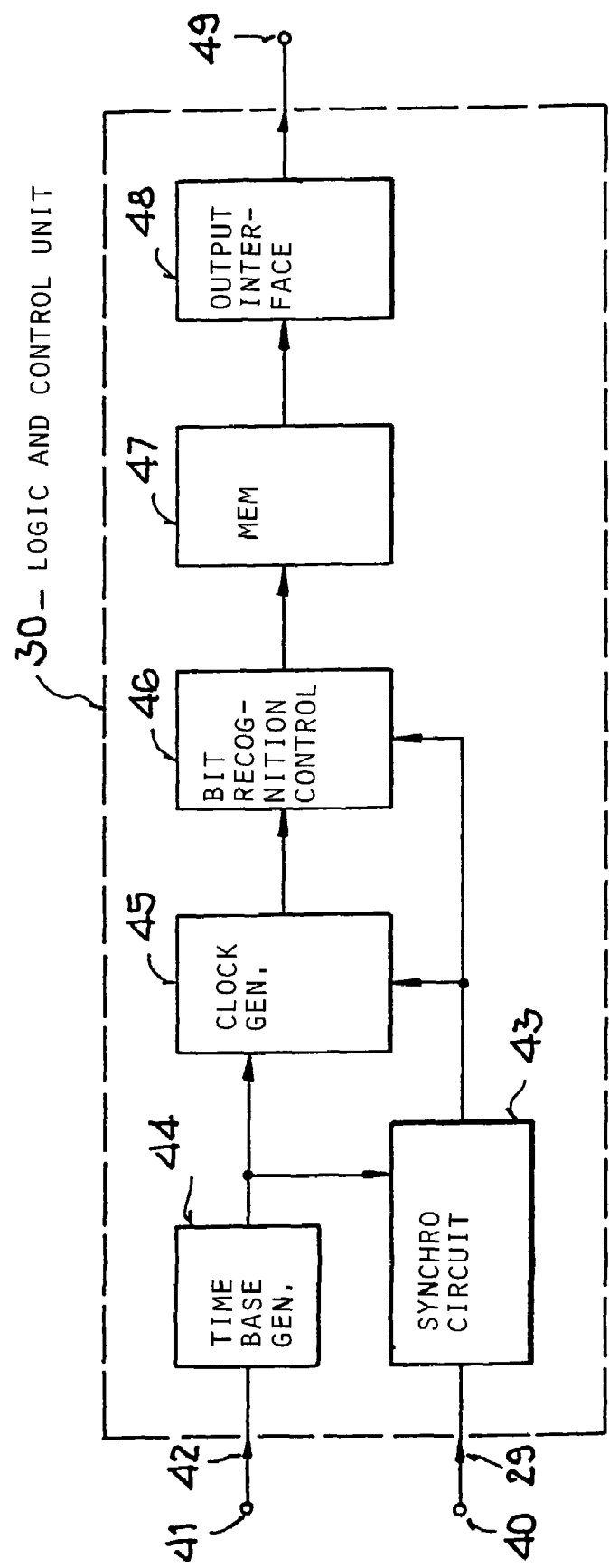
FIG. 6 shows a block circuit diagram of the construction of the logic and control unit of FIG. 5.

The block circuit of FIG. 6 shows further details of the logic and control unit 30 also shown in FIG. 5. The above mentioned TCO signal 29 is connected to a first input 40 of the logic and control unit 30. A clock signal 42 having for example a frequency of 32 kHz is supplied to a second input 41 of the logic and control unit 30. The logic and control unit 30 further comprises a synchronizing circuit 43 connected to the input 40. A time base generator 44 is connected with its input to the clock signal 42 at the terminal 41. The generator 44 generates a time base for the further signal processing or synchronization. The logic and control unit 30 also comprises a clock signal generator 45 having a first input connected to the synchronizing circuit 43 and a second input connected to the time base generator 44. The synchronizing circuit 43 and the clock signal generator 45 are connected to a respective input of a bit recognition control 46. The clock signal generator 45 is preferably a counter or a multivibrator. The bit recognition control 46 allocates to a received signal a value "0" or a value "1" depending on the amplitude and duration of the received signal. A memory 47 is connected to the output of the bit recognition control 46. The individual bit values are stored in the memory 47. The logic circuit 30 further comprises an output interface 48 connected to the output of the memory 47 and to at least one data output 49 of the logic and control unit 30. The data output 49 makes it possible to supply the values stored in the memory 47 to a program controlled unit for example a microcontroller or microprocessor connected to the output 49 but not shown in FIG. 6.

Figure 7:
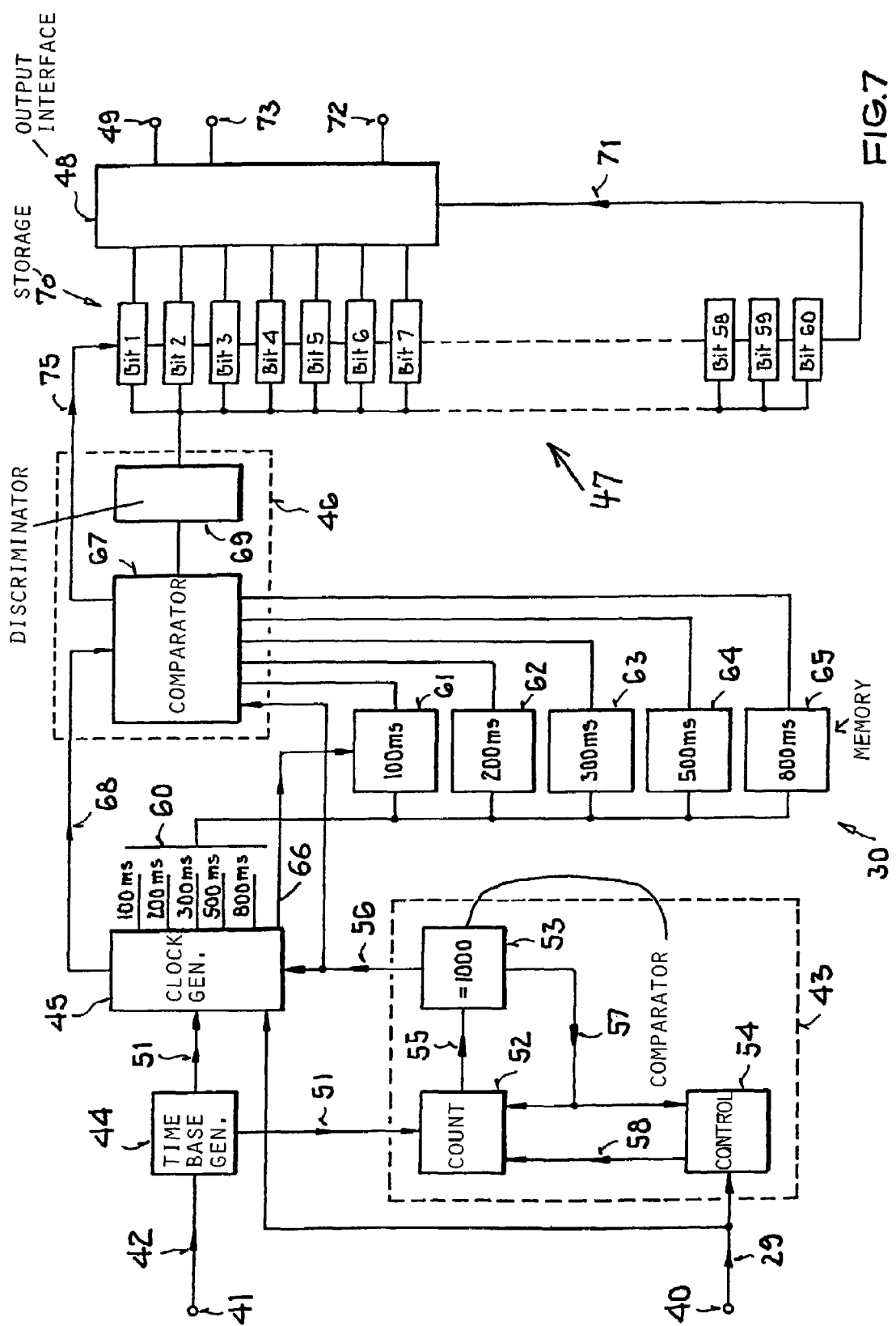
FIG. 7 illustrates, in a detailed block circuit diagram, the construction of the logic of the control unit according to FIG. 5 or 6 which include components for the synchronization, evaluation, and storage of received time signals.

FIG. 7 shows a detailed block circuit diagram of the logic and control unit 30 as shown in FIG. 6. An internal or external clock signal 42 is supplied to the clock input 41 of the time base generator 44 which supplies a defined time base to the clock signal generator 45 and to the synchronizing circuit 43. For this purpose the time base generator 44 comprises typically an input buffer and a signal divider for producing from the received clock signal 42 a further clock signal 51 which has been divided down to produce the second clock signal 51 with a defined lower frequency. For example, from the clock signal 42 having a frequency of about 32 kHz, the time base generator 44 produces the downsized second clock signal 51 having a frequency of 1024 Hz.

The synchronizing circuit 43 comprises a counter 52, a comparator 53 and a control unit 54. The counter 52 receives the downsized second clock signal 51 whereby the count of the counter 52 is stepped up with each second timing clock signal. The count or content 55 of the counter 52 is compared with the value in the comparator 53. In the instant case the value in the comparator 53 is a count of 1000. Depending on a result of this comparing, the comparator 53 controls the clock signal or time generator 45. The comparator 53 further produces a reset signal 57 which is supplied to the counter 52 and to the control unit 54. The control unit 54, which receives at its input the TCO signal 29, produces at its output a second reset signal 58 that depends on the TCO signal 29. The second reset signal 58 can also be supplied to the counter 52. The reset signal 58 resets the counter 52 when this counter is not yet synchronized. However, in the case that the counter 52 is synchronized, it will be reset by the first mentioned reset signal 57 from the comparator 53.

The time generator or clock signal generator 45 receives on the one hand the amplified and rectified TCO signal 29 and on the other hand the clock signal 51 that has been downsized to 1024 Hz. The time generator or clock signal generator 45 further receives a trigger signal 56 from the synchronizing circuit 43. This trigger signal 56, also referred to as a synchronizing signal, signifies the beginning of a second impulse and thus serves according to the invention to synchronize the time or clock signal generator 45.

The time or clock signal generator 45 comprises several outputs 60 which are connected to a corresponding number of memory units 61 to 65. These outputs 60 provide pulses having different pulse durations or information lengths, through the signal 29. However, it should be mentioned that for signals transmitted by the time signal transmitter DCF-77 only two such outputs 60 are required. The implementation illustrated in FIG. 7, however, represents an increased functional capability to make it possible to use the circuit arrangement also in connection with other time signal transmitters. For example, a signal transmitted by the time signal transmitter DCF-77 has an impulse duration either of 100 msec or an impulse duration of 200 msec. However, in other countries the impulse durations may differ, for example they may be 300 msec, 500 msec, or 800 msec as is, for example, the case in the United States of America and in Japan. With the five outputs of the clock signal or time generator 45 in FIG. 7, the circuit arrangement according to the invention is able also to distinguish impulses of these other pulse durations.

Signals representing the length of the above mentioned pulse durations are provided at the outputs 60. These output signals are stored in the respective memory positions 61, 62, 63, 64 and 65. A multiplexer may be connected between the outputs 60 and the inputs of the memory positions 61 to 65 for deciding which of the storage positions is selected for receiving a particular output signal. The time or clock signal generator 45 further produces a control signal 66 for triggering the storage unit 61 to 65. This control signal 66 indicates whether a timing impulse of a respective length has been recognized in a definite manner so that the respective memory or storage unit 61 to 65 can be used for storing. The storage units 61 to 65 are connected with their outputs to a further comparator 67. Thus, it is possible to supply the content of the storage units 61 to 65 to the comparator 67 which compares the value received from the units 61 to 65 with the respective protocol to see whether this value is acceptable. The comparator 67 receives a further control signal 68 produced by the time or clock signal generator 45. This control signal 68 shows to the comparator 67 the passage of a minute of the time signal and thus the beginning of the time signal telegram.

A decision making unit or discriminator 69 is connected to the output of the comparator 67. The discriminator 69 decides whether a bit value "0" or a bit value "1" is allocated to any value from the output of the comparator 67. The comparator 67 and the discriminator 69 together form the bit recognition control 46.

A memory 47 is connected to the output of the bit recognition control 46. This memory 47 comprises sixty bit storage locations 70 corresponding to the sixty second bits of a time signal telegram. According to a modification of the invention, the sixtieth bit storage position of the storage positions 70 may be omitted since this sixtieth bit storage position is not occupied anyway. The different bits of the transmitted time signal telegram are filed or stored in these bit memory positions 70 in a respective sequence. The filing sequence is controlled by a control signal 75 which is produced by the bit recognition control 46 or by the comparator 67. The control signal 75 makes sure that the individual bits of a transmitted time signal are filed in accordance with the sequence in the respective time signal telegram to assure a correct sequence in the bit memory positions 70. When all sixty bit memory positions 70 or all fifty-nine bit memory positions of the memory 47 are occupied, a control signal 71 is supplied to the output shift register 48.

The output shift register 48 comprises three terminals 72, 73 and 49 functioning as outputs or inputs. A signal derived from the control signal 71 at the output 72 may be tapped off at that output 72 provided that all bits of the shift register 48 are occupied. If the signal 71 is read by a microprocessor connected to an output of the shift register 48, then the microprocessor requests, if required, the data bits that are stored in the bit memory positions 70, by transmitting a request signal to the terminal 73 now functioning as an input 73. If such a request is present, the data content of the bit memory positions 70 are made available at the output of the shift register 48. Thus, the data content or bits can now very rapidly and serially be read out through the data output 49 by the microprocessor. It is also possible to provide for a parallel readout of the data available at the output 49.

FIG. 8 shows a portion of a time signal transmitted for example by the time signal transmitter DCF-77. The method according to the invention will now be explained with reference to the DCF-77 transmitter.

A total of three complete second impulses 80, 81 and 82 are shown in the example embodiment of FIG. 8. Each second impulse defines a time frame with respectively one data bit 83, 84 or 85. The first second impulse 80 begins at the time or instant t0 and ends at time or instant t2. The instant t2 forms, so to speak, the beginning of the second second impulse 81 which ends at the time or instant t4. The third second impulse 82 begins at the end of the second impulse 81, which is at t4, and is terminated at the time t6. Generally, the points of time or instants t0, t2, t4 and t6 respectively designate a beginning of a change of the time signal 89. The points of time or instants t1, t3 and t5 thus designate the end of a change in the time signal 89.

At the beginning of each second impulse 80, 81, 82 the transmitted signal exhibits a reduced amplitude, for example an amplitude reduced to 25% of the original amplitude. A reduced amplitude is present at the first second impulse 80 in a time interval 83 between t0 and t1. The remaining time interval between t1 and t2 of the second impulse 80 exhibits the full amplitude. The time areas or portions 83 to 85 with reduced amplitudes may have a duration T1, T2, in the case of the time signal from the DCF-77 transmitter: T1=100 msec or T2=200 msec whereby an impulse of 100 msec corresponds to a logic "0" and an impulse of 200 msec corresponds to a logic "1". Thus, a logic "0" is allocated to the second impulses 80 and 82, while a logic "1" is allocated to the second impulse 81. In this context it should be mentioned that an inverse logic could be applied or other impulse durations could be employed.

The method according to the invention will be described in the following with reference to the schematic illustration of a transmitted time signal according to FIG. 8 and with reference to the block circuit diagrams of FIGS. 5, 6 and 7.

Following a certain number of received time impulses the logic and control unit 30 synchronizes itself automatically to the respective beginning of a second impulse. This self synchronization is based on a known precise reference frequency which is based on an internal or even on an external fixed time base. Advantageously the fixed time base can be the frequency of a quartz oscillator which is part of each electrical clock circuit. Such a quartz oscillates at a frequency of exactly 32768 Hz (i.e. 32.768 kHz). As a result, no additional reference frequency is required. The tolerance of this clock quartz and of a reference frequency derived from the clock quartz frequency by dividing down is sufficient for the present purposes. This reference frequency is obtained by a frequency divider which downsizes or divides the quartz frequency to a well suitable value of, for example, 1024 Hz, whereby for example a divisor of $2^5=32$ is used.

The TCO start impulse resets the count 55 in the counter 52 back to 0. The counter 52 continuously counts up the impulses of the 1024 Hz signal, as produced by the time base-generator 44. Each impulse of the 1024 Hz signal corresponds approximately to a time duration of 1 msec. When a new TCO impulse 29 arrives in the counter 52, the comparator 53 ascertains whether the count 55 is larger, smaller or equal to the value 1000 which is stored in the comparator 53. If the count 55 corresponds approximately to the value 1000 this fact also signifies a time duration or time spacing of 1 sec, namely 1000 msec. Thus, the beginning of a new second is marked. The comparator 53 generates from this time mark an impulse 56 which is used as a synchronizing impulse. Simultaneously, the count 55 of the counter 52 is set back to zero by the reset signal 57. As soon as the count 55 in the counter 52 is set back to zero the counter 52 begins counting again in response to the clock signal 51. For each new count of 1000 the synchronizing impulse 56 is again triggered. In this manner, a highly precise synchronization over a wide range of the received, amplified and rectified time signals 29 is achieved by the internal count of the impulse signal 51.

If the TCO starting impulse 29 is received prior to the counter 52 having reached the count 1000 or after such count has been achieved, then no synchronization impulse 56 is generated or triggered. In that case merely the count 55 of the counter 52 is set to zero and a new count begins. This whole operation takes place automatically until a new stop impulse arrives at the input and this procedure is repeated until the count 55 again corresponds to about the value 1000. In this context it should be mentioned that it is advantageous to interpret a count that deviates merely slightly from 1000 in the count 55 of the counter 52 as synchronized whereupon a synchronization signal 56 is triggered or generated.

In this manner the logic and control unit 30 synchronizes itself on the basis of the known precise reference frequency of 32768 Hz following a certain number of received start impulses. This self synchronization takes place automatically and relative to the respective beginning of a second impulse. The synchronization takes place independently of the respective impulse duration of the transmitted second impulses. Thus, synchronization can be achieved already after a few passages of the counter 52 and thus following a few second impulses. When a so-produced synchronization is established, the precise beginning of a second impulse and thus of the information of the respective data bits 83 to 85 is precisely known. In order to read out the data bits 83 to 85 it is not necessary to read out the entire content of a respective second impulse 80 to 82. Rather it is completely sufficient if the end of the respective data bits 83 to 85 is checked. The respective end of each of these data impulses 83 to 85 is also precisely known because the data bits 83 to 85 transmitted by the different time signal transmitters, cannot have a random duration but have a defined duration.

In the case of the German time signal transmitter DCF-77, the end of the transmitted signal of the respective data bits 83 to 85 can be expected either after 100 msec or after 200 msec as measured from the beginning of the second impulse 80 to 82. This means that merely these time areas or durations need to be analyzed regarding their amplitude, namely after 100 msec and after 200 msec. This analyzing takes place in such a manner that following a respective time duration it is detected whether or not a reduced or changed amplitude is present. As a result a conclusion can be made regarding the impulse duration of the data bit 83 to 85 and thus regarding the content of the data bit 83 to 85 itself. Hence, an instantaneous allocation of a bit value to the data bit or impulse 83 to 85 is possible.

In order to avoid ambiguities, the exact points of time which are available after 100 msec or after 200 msec following the beginning of a second impulse are not analyzed exclusively. Rather, it is suitable and practical for tolerance reasons and for avoiding disturbance influences, to also include in the analysis a certain duration prior to and following these points of time. Thus, tolerance windows 86 to 88 around the 100 msec point or time marker and around the 200 msec point or time marker are obtained. These tolerance windows 86 to 88 can be adapted in a suitable way to the individual requirements, for example with a view to the fact whether or not the time signal receiver is present in an area which is subject to substantial disturbances. If the time signal receiver is for example present in an area subject to substantial disturbances, then these tolerance windows 86 to 88 should be selected to be broader than in a situation where the clock is used in an area that has few disturbances.

Furthermore, the dimensioning of the time window 86 to 88 should also take into account the sensitivity that is achieved by the reference frequency and by the synchronization circuit.

In an advantageous embodiment of the invention it is suitable to analyze not only the areas around the time markers 100 msec and 200 msec. Rather, it is frequently practical to analyze a full time window 86 to 88 which includes the instant at 100 msec and the instant at 200 msec to see whether the time window includes a rise of the impulse amplitude. For example in both instances a time window 86 to 88 could be used that extends between 75 msec and 225 msec following the beginning of a second. In this example the evaluation takes place only for the duration of 150 msec within each second impulse 80 to 82.

More specifically, an evaluation of the data bits takes place only in the area of the time window 86 to 88. The time areas or portions of a second outside of the time window 86 to 88 that is relevant for the determination of the value of the data bits 83 to 85, are thus not taken into account according to the invention and thus are not investigated. As a result, the effort and expense for obtaining the data bit 83 to 85 is reduced to a minimum. Disturbances in the received and investigated time signal are thus insignificant because these disturbances are not used for the determination of the data bits 83 to 85.

The decoding and the display of the exact time and date according to the invention based on the transmitted time signal are performed as follows. The starting impulse for the next complete minute of the time signal telegram can be recognized automatically by means of the last or most recent bit of the time signal telegram. In this automatic recognition, the recognized data bits 83 to 85 are stored in a respective shift register at the memory position or location allocated to the respective data telegram. When all 59 data bits of the data telegram have been stored in the shift register, an output signal 71 is produced in order to signal to a connected evaluating unit that the data are now present and can be read out. In a radio controlled clock, this evaluation unit is generally realized by a four bit microcontroller or processor. The microcontroller now requests these data through the terminal 73 whereupon these data are rapidly transmitted through the output 49 to the microcontroller. This data transmission takes, for example, only 100 msec for all 59 bits of a minute. The microcontroller in the meantime is then free for performing other tasks for example control tasks. During this time of transmission, the feedback control voltage of the receiver circuit is maintained at its value that it had prior to the data transmission. In this manner it is possible to avoid adverse influences on the sensitivity of the receiver by disturbances due to the data transfer.

It is possible to adjust the control and logic unit 30 to different transmitter protocols by an external wiring of control conductors provided for this purpose. For example, the logic and control unit 30 and thus the radio controlled clock may be wired to evaluate protocols in addition to or as an alternative to the protocol of the German transmitter DCF-77. More specifically the unit 30 can be wired to operate with transmitter protocols such as WWVB in the USA and/or MSF in Great Britain, or GGY in Japan, or BPC in China. Thus, it is an advantage of the present receiver that it can handle any one or all of these protocols.

In case that more than two impulse lengths are present in the protocol of the time signal transmitter, the present invention provides in an advantageous embodiment that an adequate bit value is allocated to the further impulse lengths that is adequate to the position of the data impulse in the data telegram. Thus, a plausibility check becomes possible because the different protocols of the time signal transmitters are stored in the control and logic unit 30. An error recognition and an error removal routine derived from the error recognition are possible very early, namely prior to the downloading of the data by the microcontroller.

FIG. 9 shows a circuit diagram of a radio controlled clock 100 that may have one or more antennas 2 for receiving the time signal 3 as transmitted by a time signal transmitter 101. The antenna 2 is connected with its output to the integrated circuit 20 shown in FIG. 5. The circuit 20 comprises the above described logic and control unit 30 as shown in FIGS. 6 and 7. The antenna 2 and the integrated circuit 20 together form the receiver 1. The outputs of the receiver 1 are connected to a program controlled unit 102 for example a microcontroller or microprocessor. The microcontroller 102 receives the data bits produced by the receiver 1 and calculates out of these data bits the exact time and the exact date in the form of the signal 105 that is displayed to indicate the time and date. The radio controlled clock 100 further comprises an electronic clock 103 the time of which is controlled by a clock quartz 104. The electronic clock 103 is connected with its output to a display 106 that may be analog or digital, for displaying the time of day. The output of the microprocessor 102 is connected to the clock 103 to supply the signals 105 to the clock 103 whereby the clock 103 indicates the date and or the time in a respectively corrected manner.

The invention has been described particularly with reference to the German time signal transmitter DCF-77. However, it should be noted, that the present invention is not limited to receiver circuits or rather radio controlled clocks that are capable of cooperating only with the German time signal transmitter. Rather, the invention can also be used advantageously in connection with any other time signal transmitters.

Further, a microcontroller is not necessarily required for the program controlled unit. Rather, the function of a microcontroller can also or alternatively be performed by another circuit for example a microprocessor, a digital signal processor DSP, a fuzzy controller, a hard wired logic circuit or a programmable logic circuit for example an FPGA-circuit, a PLD circuit or the like. Particularly the invention is not limited to the above given numerical examples. Rather, the invention can be modified within the scope of the current knowledge of those skilled in this art.

The above illustrated different concrete circuit-technical embodiments are merely examples which can be modified by the exchange of simple structural elements or functional units without departing from the basic function of the receiver according to the invention especially with regard to the synchronization device, the time generator and the memory device.

Furthermore, radio controlled clocks as disclosed herein are intended to include clocks in which the transmission of a time signal is accomplished by wire rather than by radio transmission. Clocks that receive the time signal by wire transmission may have the above described construction.

In the above described example embodiments, the encoding was realized by a respective reducing of the carrier signal at the beginning of a time frame especially by an amplitude reduction in the carrier wave. It is to be understood, that the encoding may also be accomplished by an increase of the carrier amplitude at the beginning of a time frame or generally by a change of the amplitude of the carrier signal. In the above example embodiments, the change of the time signal amplitude was detected at the beginning of the change. Based on this detection of the beginning it is possible according to the invention to make conclusions regarding the respective end depending on the corresponding coding. This analysis of the data signals is also an example and it is to be understood that it is possible to start the analysis with the end of a data impulse. In that case a conclusion could be made regarding the change of the carrier amplitude at the beginning of a data impulse by calculating backwards, without departing from the teachings of the invention. However, it is more advantageous to perform the method according to the invention by starting the evaluation with the beginning of a change in the carrier amplitude to thereby determine the end of the respective time duration. Starting the count at the end of a change by counting backwards would merely require a circuit technical additional component for example a buffer memory.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method f or retrieving time information from a time signal (89) transmitted by a time signal transmitter, wherein said time information is present in said time signal in the form of data bits (83-85), said method comprising the following steps:

a) forming said time signal (89) of a multitude of time frames (80-82), each said time frame having a constant time frame duration, b) allocating to each said time frame (80-82) at least one said data bit (83-85) representing said time information in said time signal, c) determining a logic value of said at least one data bit (83-85) on the basis of a time duration (T1, T2) of an amplitude change of an amplitude of said time signal (89), d) allocating a first said logic value to a first said data bit (83,85), said first logic value representing a first said time duration (T1) of a first said amplitude change of said time signal (89), e) allocating a second said logic value to a second said data bit (84), said second logic value representing a second said time duration (T2) of a second said amplitude change, said first and second amplitude changes providing at least two amplitude changes, f) determining a first instant (t0, t2, t4) respectively of said first and second amplitude changes g) determining a second instant (t1, t5) relative to the first instant (t0, t2, t4) and with reference to said first time duration (T1), h) determining a third instant (t3) relative to the first instant (t0, t2, t4) and with reference to the second time duration (T2), i) examining a first time window (86) encompassing said second instant (t1, t5) to determine whether the amplitude of the time signal (89) returns to an original amplitude value, and j) allocating said first logic value to one of said at least one data bit (83) as said first data bit if said amplitude returns within said first time window (86) to the original amplitude value.

2. The method of claim 1, comprising allocating said second logic value to said second data bit (84) if said amplitude of said time signal does not return to said original amplitude value in said first time window (86).

3. A method for retrieving time information from a time signal (89) transmitted by a time signal transmitter, wherein said time information is present in said time signal in the form of data bits (83-85), said method comprising:

a) forming said time signal (89) of a multitude of time frames (80-82), each said time frame having a constant time frame duration, b) allocating to each said time frame (80-82) at least one data bit (83-85) that comprises an amplitude change of an amplitude of said time signal from an initial amplitude value of said time signal, and that represents said time information in said time signal, c) determining a logic value of said at least one data bit (83-85) respectively in each said time frame on the basis of a time duration (T1, T2) of said amplitude change of said time signal (89), wherein a first logic value will be allocated to a first data bit (83,85) of said data bits, if said time duration (T1) of said amplitude change of said first data bit corresponds to first time duration (T1), and a second logic value will be allocated to a second data bit (84) of said data bits if said time duration (T2) of said amplitude change of said second data bit corresponds to a second time duration (T2) different from said first time duration, d) determining a first instant (t0, t2, or t4) of a beginning of said amplitude change, e) specifying a second instant (t1, t5) at an end of said first time duration (T1) following said first instant (t0, t2, or t4);

f) specifying a third instant (t3) at an end of said second time duration (T2) following said first instant (t0, t2, or t4), and g) wherein, in one of said time frames, said determining of said logic value comprises examining said time signal in a first time window (86, 88) encompassing said second instant to determine whether said amplitude of said time signal (89) returns to said initial amplitude value during said first time window, and allocating said first logic value to said first data bit (83) if said amplitude returns to said initial amplitude value during said first time window.

4. The method of claim 3, further comprising allocating said second logic value to a second said data bit (84) if said amplitude does not return to said initial amplitude value during said first time window (86).

5. The method of claim 3, wherein, in another of said time frames, said determining of said logic value further comprises examining said time signal in a second time window (87) encompassing said third instant (t3) to determine whether said amplitude of said time signal (89) returns to said initial amplitude value during said second time window, and allocating said second logic value to said second data bit (84) if said amplitude returns to said initial amplitude value during said second time o window (87).

6. The method of claim 5, wherein a single continuous time window (88) encompassing both said first time window and said second time window continuous with one another is provided, and said time signal is examined during said first time window and during said second time window making up said single continuous time window.

7. The method of claim 3, further comprising examining said time signal (89) only during said first time window and/or a second time window encompassing said third instant to determine whether disturbances are present in said time signal during said time window or said time windows and removing disturbances from said time signal only during said time window or said time windows.

8. The method of claim 3, further comprising disregarding said amplitude of said time signal outside of said first time window and/or a second time window encompassing said third instant in said determining of said logic value.

9. The method of claim 3, wherein said first time duration (T1) is shorter than said second time duration (T2).

10. The method of claim 3, wherein said amplitude change of said time signal (89) comprises a reduction of said amplitude of said time signal.

11. The method of claim 3, wherein said first instant (t0, t2, t4) marks a beginning of a time frame (80 to 82) of said time frames.

12. The method of claim 3, wherein said second and third instants (t2, t3, t5) respectively define a respective end of said amplitude change of said time signal (89).

13. The method of claim 12, wherein said third instant (t3) occurs following said second instant (t1, t5) in a respective time frame (80, 82) of said time frames.

14. The method of claim 3, wherein said first logic value is defined as a logic "0" and wherein said second logic value is defined as a logic "1".

15. The method of claim 3, further comprising:

storing 59 or 60 of said data bits, beginning with a first bit of a data telegram represented by said data bits in said time signal, sequentially in an intermediate memory, reading out all said 59 or 60 data bits from said intermediate memory (70) and storing said data bits in a buffer memory to make said data bits ready, and transferring said data bits from said buffer memory to a computer unit and calculating in said computer unit, from said 59 or 60 data bits, at least one of an exact time and an exact date

16. A receiver for receiving a time signal including time information in a time signal telegram comprising 59 or 60 data bits (83-85), wherein each one of said data bits is respectively formed by an amplitude change of an amplitude of said time signal (89) and wherein a first logic value or a second logic value of said one data bit (83-85) is provided by a duration (T1, T2) of said amplitude change, said receiver comprising at least one antenna (2) adapted to pick-up said time signals (3), a logic and control unit (30) adapted to retrieve said time information from said time signals, and an input/output interface (32) connected to an output of said logic and control unit (30) and adapted to provide output signals that have been derived from said time information of said time signals (3), wherein said logic and control unit comprises a bit recognition circuit (45, 46) adapted to allocate said first logic value or said second logic value to said data bit in accordance with a protocol of said time signal telegram and in accordance with said duration of said amplitude change, and wherein said bit recognition circuit (45, 46) comprises a time generator (45) adapted to determine, on the basis of a fixed time base (51) and in accordance with said protocol of said time signal telegram, whether said duration of said amplitude change corresponds to a first duration (T1) which corresponds to a logic "0" or a second duration (T2) which corresponds to a logic "1".

17. The receiver of claim 16, wherein said time signal (3) comprises a multitude of time frames (80-82) of constant duration, and wherein at least one of said data bits (83-85) is allocated to each one of said time frames (80-82).

18. The receiver of claim 16, wherein said bit recognition circuit (45, 46) comprises a circuit for recognizing and treating disturbances in said time signal (3, 89).

19. The receiver of claim 16, wherein said logic and control unit further comprises a synchronizing unit (43) adapted to synchronize said bit recognition circuit (45, 46), on the basis of said fixed time base (51), with a beginning (t0, t2, t4) and an end of a time frame (80-82) of said time signal (3, 89).

20. The receiver of claim 19, wherein said synchronizing unit (43) comprises a counter (52) adapted to count up a count (55) in response to a reference frequency, a comparator (53) adapted to compare said count (55) with a predetermined value which corresponds to a duration of said time frame, a reset unit (54) adapted to reset said counter (52) in response to a correspondence of said count (55) with said predetermined value or in response to a new time signal (29), and an output unit (53) adapted to produce a synchronizing signal (56) that is adapted to trigger said bit recognition circuit (45, 46) when said count (55) corresponds with said predetermined value.

21. The receiver of claim 16, further comprising a reference unit (44) including a frequency divider adapted to produce the fixed time base (51) based on a reference frequency (42).

22. The receiver of claim 16, further comprising an intermediate memory (70) adapted to store said time information in a sequence of a protocol for said time signal telegram.

23. The receiver of claim 22, wherein said intermediate memory (70) is so dimensioned to have a memory space sufficient to store at least a part of said time information which is required for a complete representation of said time signal telegram.

24. The receiver of claim 16, further comprising a receiver memory (70) and an output shift register (48) having inputs connected to said receiver memory (70) so as to be adapted to store a data content of said receiver memory and from which said data content can be read out through output terminals (49) of said output shift register (48).

* * * * *

UNITED STATES PATENT AND TRADEMARK OFFICE
CERTIFICATE OF CORRECTION

PATENT NO. : 7,486,657 B2
APPLICATION NO. : 10/910261
DATED : February 3, 2009
INVENTOR(S) : Roland Polonio et al.

It is certified that error appears in the above-identified patent and that said Letters Patent is hereby corrected as shown below:

In the Specifications:

Column 7,
Line 16, after "and" (second occurrence), delete "-";

In the Claims:

Column 18,
Line 53, Claim 1, after "method", replace "f or" by --for--;

Column 19,
Line 11, Claim 1, after "changes", insert --,--;

Column 20,
Line 16, Claim 5, after "time", delete --o--;
Line 53, Claim 15, after "storing", replace "59or" by --59 or--;
Line 62, Claim 15, after "date", insert --.--.

Signed and Sealed this

Twelfth Day of October, 2010

David J. Kappos
*Director of the United States Patent and Trademark Office*